US007676299B2

(12) United States Patent
Clarke et al.

(10) Patent No.: US 7,676,299 B2
(45) Date of Patent: Mar. 9, 2010

(54) APPARATUS FOR TRACKING AND DISPENSING REFRIGERATED MEDICATIONS

(75) Inventors: Darcy O. Clarke, Kent, WA (US); James E. Torina, Issaquah, WA (US)

(73) Assignee: Talyst Inc., Bellevue, WA (US)

( * ) Notice: Subject to any disclaimer, the term of this patent is extended or adjusted under 35 U.S.C. 154(b) by 0 days.

(21) Appl. No.: 11/835,269

(22) Filed: Aug. 7, 2007

(65) Prior Publication Data

US 2008/0029601 A1 Feb. 7, 2008

Related U.S. Application Data

(60) Provisional application No. 60/836,457, filed on Aug. 7, 2006.

(51) Int. Cl.
*G06F 17/00* (2006.01)

(52) U.S. Cl. ....................... 700/231; 700/232; 700/242; 700/243; 221/150 R

(58) Field of Classification Search ......... 700/231-244; 221/150 R, 1-312 C; 312/236, 97.1
See application file for complete search history.

(56) References Cited

U.S. PATENT DOCUMENTS

| | | | | |
|---|---|---|---|---|
| 2,701,746 | A * | 2/1955 | Piggott | 312/215 |
| 2,968,518 | A * | 1/1961 | Braunsberg | 312/97.1 |
| 4,519,522 | A * | 5/1985 | McElwee | 221/13 |
| 4,677,777 | A * | 7/1987 | Hoffman et al. | 40/460 |
| 5,337,920 | A * | 8/1994 | Clausen | 221/5 |
| 6,112,502 | A * | 9/2000 | Frederick et al. | 53/411 |
| 6,123,223 | A * | 9/2000 | Watkins | 221/121 |
| 6,131,399 | A * | 10/2000 | Hall | 62/127 |
| 6,532,399 | B2 | 3/2003 | Mase | |
| 6,604,019 | B2 * | 8/2003 | Ahlin et al. | 700/231 |
| 6,636,780 | B1 * | 10/2003 | Haitin et al. | 700/236 |
| 6,874,684 | B1 * | 4/2005 | Denenberg et al. | 235/381 |
| 7,262,698 | B1 * | 8/2007 | Frederick et al. | 340/545.6 |
| 2002/0032582 | A1 * | 3/2002 | Feeney et al. | 705/2 |
| 2004/0054436 | A1 * | 3/2004 | Haitin et al. | 700/236 |
| 2005/0240305 | A1 * | 10/2005 | Bogash et al. | 700/242 |
| 2007/0043469 | A1 * | 2/2007 | Draper | 700/231 |
| 2007/0078562 | A1 * | 4/2007 | Park, IV | 700/243 |
| 2007/0187423 | A1 * | 8/2007 | Bedore et al. | 221/123 |

OTHER PUBLICATIONS

International Search Report and Written Opinion dated Jul. 21, 2008, issued in corresponding Application No. PCT/US07/75375, filed Aug. 7, 2007.

* cited by examiner

*Primary Examiner*—Gene Crawford
*Assistant Examiner*—Michael K Collins
(74) *Attorney, Agent, or Firm*—Christensen O'Connor Johnson Kindness PLLC

(57) ABSTRACT

The present disclosure provides a medication dispenser having a refrigerated compartment and a plurality of access doors that provide access to a limited portion of the refrigerated compartment. A plurality of turntables are rotatably disposed within the refrigerated compartment. The turntables receive at least one medication in a predetermined location, and each turntable aligns with an access door. The dispenser further includes a computer system that receives input selecting a first medication to be dispensed and outputs a first signal in response to the input. A controller is operably coupled to the refrigerated compartment and receives the first signal from the computer system. The controller outputs a second signal to rotate a turntable such that the first medication is positioned adjacent an access door, and the controller outputs a third signal to unlock the adjacent access door.

18 Claims, 4 Drawing Sheets

APPARATUS FOR TRACKING AND DISPENSING REFRIGERATED MEDICATIONS

CROSS-REFERENCE TO RELATED APPLICATION

This application claims the benefit of U.S. Provisional Application No. 60/836,457, filed Aug. 7, 2006, the disclosure of which is hereby expressly incorporated by reference.

BACKGROUND

Secure, accurate tracking and dispensing of medications is crucial to the modern practice of medicine, particularly in hospital settings, pharmacies, and long term care facilities, such as nursing homes. To provide readily accessible medication at a particular site, a large formulary of available medications are often stored within a dispensing machine located at the site that is capable of dispensing medications when needed. To prevent incorrect or unauthorized medications from being dispensed, use of the dispensing machine is often limited to authorized personnel only. Moreover, to control inventory and prompt reorders, it is helpful to track the dispensed medications.

Some medications require refrigeration to maintain potency. Moreover, refrigerated medications are often more valuable than other medications, such as oral solid medications (i.e. pills). While a standard refrigerator will keep medications at the proper temperature, it does not provide tracking or secure storage of the medications. Thus, it is desired to have machine for securely tracking and dispensing refrigerated medications.

SUMMARY

The present disclosure provides a medication dispenser having a refrigerated compartment and a plurality of access doors that provide access to a limited portion of the refrigerated compartment. A plurality of turntables are rotatably disposed within the refrigerated compartment. The turntables receive at least one medication in a predetermined location, and each turntable aligns with an access door. The dispenser further includes a computer system that receives input selecting a first medication to be dispensed and outputs a first signal in response to the input. A controller is operably coupled to the refrigerated compartment and receives the first signal from the computer system. The controller outputs a second signal to rotate a turntable such that the first medication is positioned adjacent an access door, and the controller outputs a third signal to unlock the adjacent access door.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
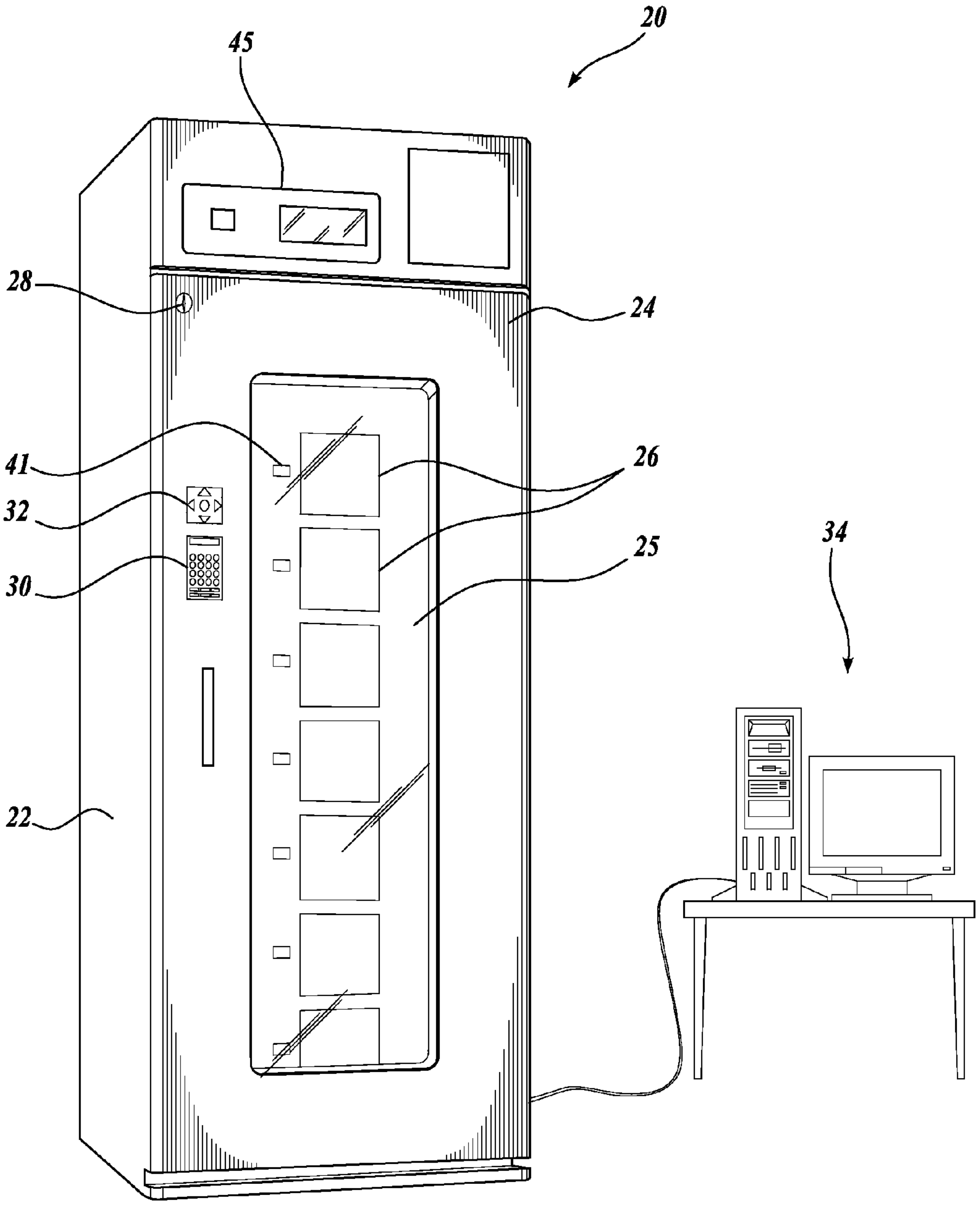
FIG. 1 is a perspective view of an exemplary embodiment of a refrigerated dispenser.

Referring to FIG. 1, a refrigerated dispenser 20 constructed in accordance with one embodiment of the present disclosure is best seen by referring to FIG. 1. Although the refrigerated dispenser 20 will be described hereinafter with reference to refrigerated medications, it will be appreciated that aspects of the refrigerated dispenser 20 have wide application and may be suitable for use with other dispensable products where secure, trackable, refrigerated dispensing is desired. Accordingly, the following descriptions and illustrations herein should be considered illustrative in nature, and thus, not limiting the scope of the present disclosure.

FIG. 1 illustrates one exemplary embodiment of the refrigerated dispenser 20, which generally includes a refrigerated compartment 22, an interior carousel assembly 36 for holding the medications (see FIG. 2), and a computer system 34 in communication with the refrigerated compartment 22. The refrigerated compartment 22 is any preferred shape and size and includes a suitable refrigeration unit 49 (shown in phantom) that is adapted to maintain the medicine at a suitable temperature, such as about 4 degrees Celsius. A light (not shown) may also be provided within the refrigerated compartment 22 to assist in the retrieval of medicine. The refrigerated compartment 22 may also include a display panel 45, such as a Liquid Crystal Display panel (LCD), for displaying the temperature and humidity of the refrigerated compartment 22, error messages, etc. The display panel 45 may instead be a touch screen in communication with the computer system 34 that allows a user to input information for using the dispenser 20.

The refrigerated compartment 22 includes a main door 24 having a transparent opening 25. The refrigerated compartment 22 further includes an optional secondary door 27 disposed behind the main door 24, wherein the secondary door 27 includes a plurality of securable access doors 26 formed therein. The plurality of securable access doors 26 are positioned behind the transparent opening 25 in the main door 24. It should be appreciated that the plurality of access doors 26 may be formed within the main door 24 if the secondary door 27 is omitted. The secondary door 27 allows access to the interior of the refrigerated compartment 22 for stocking the unit with medications, repairing the compartment 22, etc. In the alternative, the secondary door 27 could be located on another side of the refrigerated compartment 22 separate from the main door 24 for accessing the interior of the refrigerated compartment 22.

The access doors 26 provide secure, select access to medications stored within the refrigerated compartment 22. The access doors 26 are aligned in a substantially vertical fashion and spaced generally equidistant from one another. Each access door 26 includes a suitable lock (not shown) that allows the door 26 to be locked or unlocked separately from the other access doors 26. The main door 24 may also include a suitable lock 28 such that a user would need to unlock both the main door 24 and the access doors 26 to access the medications, thereby providing additional security.

The refrigerated compartment 22 may include a security panel 30 that can be used to unlock the main door 24 or any of the access doors 26. The security panel 30 may require a user to input a security code or a password. In the alternative, the security panel 30 may be a keycard device or a biometric data scanning device for scanning such things as fingerprints or retinas.

Figure 2:
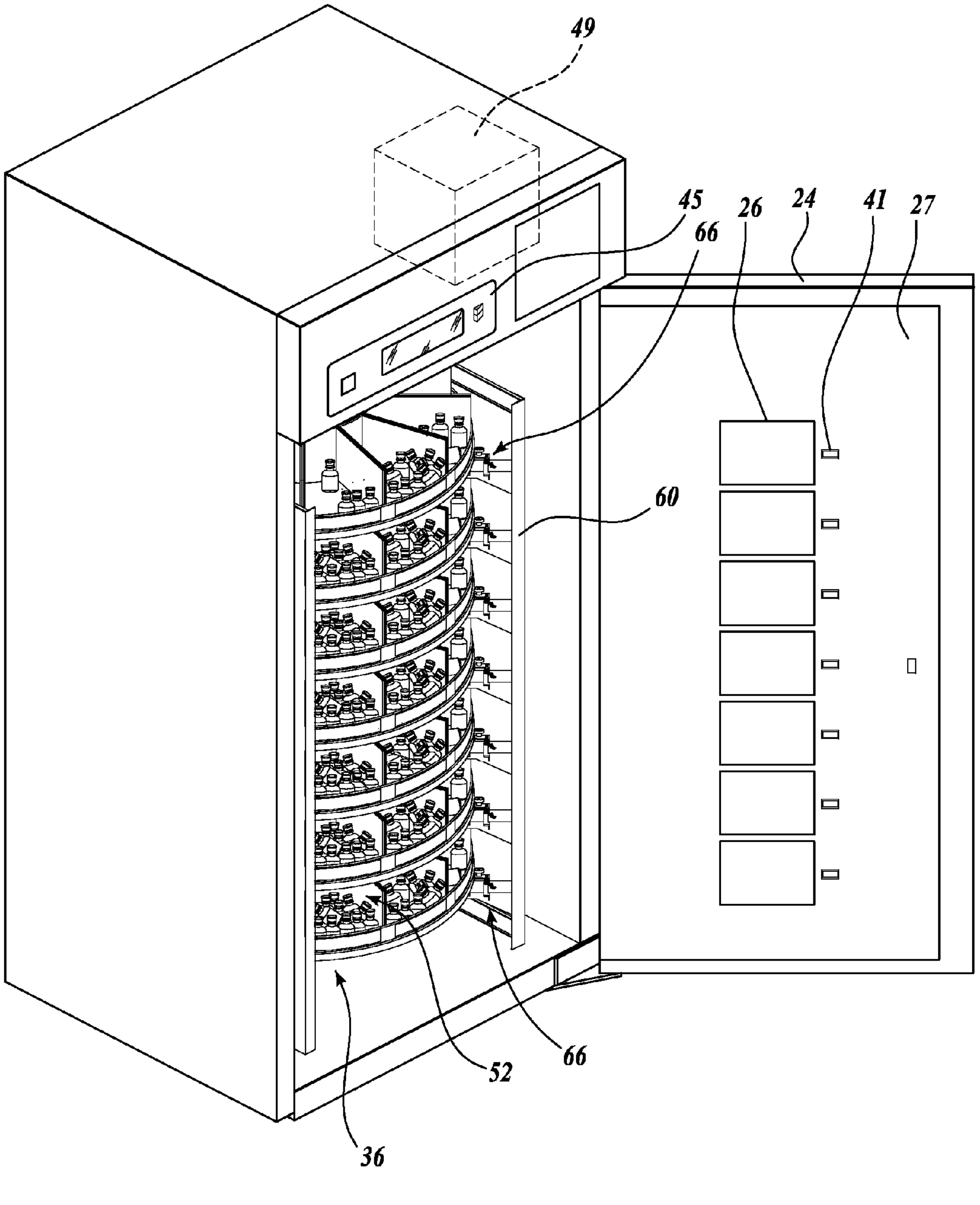
FIG. 2 is a perspective view of the refrigerated dispenser of FIG. 1 showing an internal carousel assembly, wherein the carousel assembly includes a plurality of turntables.
Figure 3:
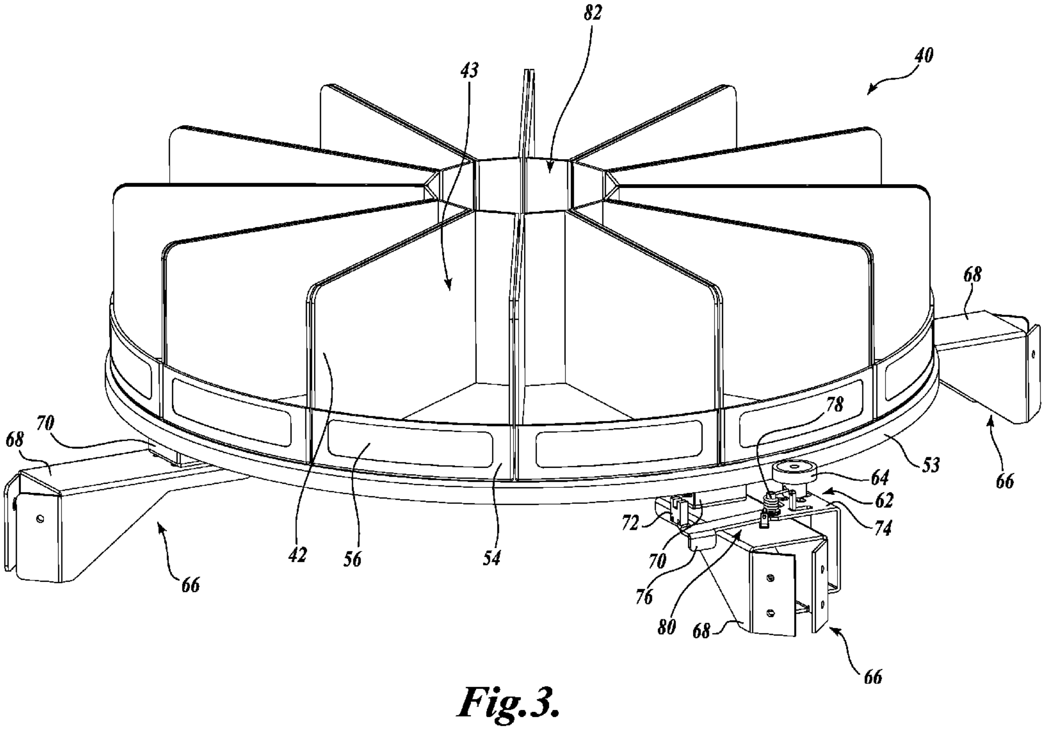
FIG. 3 is a perspective view of a turntable of FIG. 2, wherein a drive mechanism is engaging the turntable.

Referring to FIGS. 2 and 3, the interior carousel assembly 36 for storing the medications within the refrigerated compartment 22 in an organized, secured manner will now be described in more detail. The carousel assembly 36 is disposed within a removable frame 60 received within the refrigerated compartment 22. The carousel assembly 36 includes a plurality of turntables 40 that are individually coupled to the frame 60 and vertically positioned on the frame 60 such that each turntable 40 is aligned with an access door 26 on the exterior of the refrigerated compartment 22.

Each turntable 40 preferably includes a circular base 53 and a plurality of dividers 42 that extend upwardly from the base 53. The dividers 42 separate the base 53 into a plurality of divided sections 43, wherein each section 43 may hold a different type of medication or medication container 52 (hereinafter collectively referred to as "medication 52"). In the preferred embodiment, the dividers 42 extend radially outwardly from the approximately the center of the base 53 to define equally divided sections 43. The dividers 42 also collectively define a center opening 82 near the center of the base 53 that corresponds to a center opening (not shown) in the base 53. This opening allows air to flow upwardly and downwardly through the turntables 40, allowing for better circulation of air within the refrigerated compartment 22.

Figure 4:
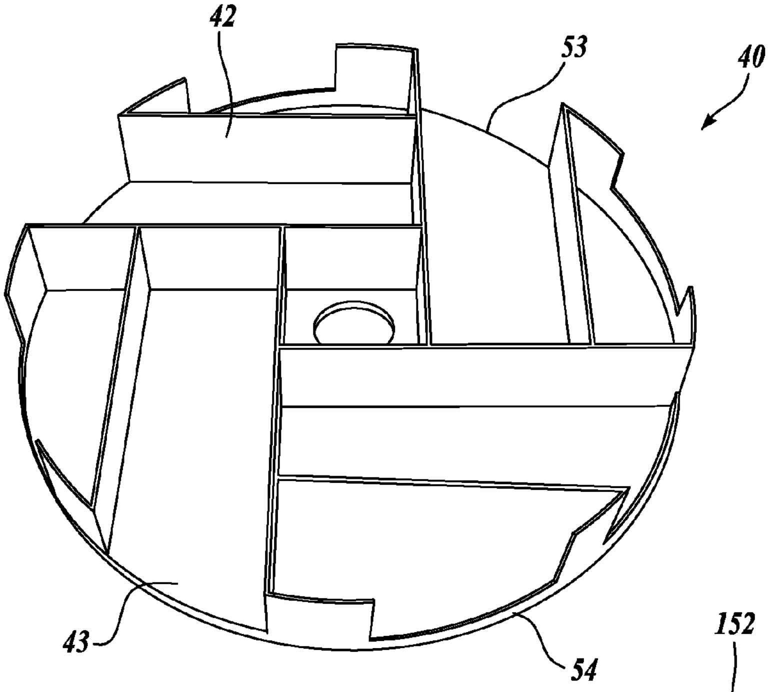
FIG. 4 is a perspective view of a first alternate embodiment of a turntable shown in FIG. 2.

The dividers 42 may instead be rearranged on the base 53 to define smaller or larger sections 43 for receiving medication of different shapes and sizes, as shown in FIG. 4. In an alternative assembly, a plurality of totes, canisters, containers, etc. may be coupled together along their sidewalls or side portions to define a turntable 40 or similar assembly (not shown). In this alternative assembly, the sidewalls or side portions define dividers that can separate the turntable 40 into a plurality of divided sections 43. Medications 52 are loaded onto the base 53 and retained on the base 53 by a lip 54 formed around the perimeter of the base 53 or with other suitable means.

The turntables 40 are rotatably disposed within the frame 60 such that the turntables 40 may be rotated to position a desired medication 52 adjacent an access door 26 for dispensing. Each turntable 40 is secured to the frame 60 through a plurality of bracket assemblies 66. As can best be seen by referring to FIG. 3, each bracket assembly 66 includes a mounting bracket 68 that is securable to the frame 60 in any suitable manner. The bracket assembly 66 further includes a suitable slide mechanism 70 that slidably mounts the base 53 of the turntable 40 to the mounting bracket 68 such that the turntable 40 is rotatably disposed on the plurality of mounting brackets 68.

A suitable drive mechanism, such as a puck drive mechanism 62, is coupled to one of the bracket assemblies 66 for rotating the turntable 40. The puck drive mechanism 62 includes a puck drive roller 64 that engages the base 53 of the turntable 40. The puck drive roller 64 is driven by a suitable motor/encoder assembly (not shown) to rotate the turntable 40 in first and second directions. The puck drive roller 64 is otherwise maintained in a locked position by the puck drive mechanism 62 to prevent the turntable 40 from being manually rotated, especially when an access door 26 is opened. However, each puck drive mechanism 62 includes a release lever 80 for unlocking the turntables 40 and allowing manual rotation of the turntables 40 in the event of a mechanical or electrical failure.

The release lever 80 includes a bracket portion 74 for receiving the puck drive mechanism 62 and a tab portion 76 extending outwardly therefrom. The release lever 80 is pivotally mounted to the mounting bracket 68 through a pin 78, wherein the pin 78 defines the pivot point of the release lever 80. The pin 78 is positioned between the tab portion 76 and the bracket portion 74. The release lever 80 is spring-loaded on the pin 78 such that the bracket portion 74 is urged towards the turntable 40, thereby biasing the puck drive roller 64 against the turntable 40 and into the locked position. To unlock the turntable 40, the tab portion 76 is urged toward the turntable 40 such that the release lever 80 pivots about the pin 78 and the bracket portion 74 is moved away from the turntable 40. The tab portion 76 is moved towards the turntable 40 until the puck drive roller 68 disengages the turntable 40, thereby unlocking the turntable 40 and allowing for manual rotation.

With each turntable 40 having a separate puck drive mechanism 62, the turntables 40 may be individually rotated to position a desired medication on each turntable 40 adjacent an access door 26. With the desired medications positioned adjacent an access door, the dividers 42 separate the medications 52 and prevent more than one medication 52 or more than one type of medication 52 from being accessed through the access door 26. This separation prevents the user from picking the wrong medication 52 and/or prevents a user from accessing unauthorized medications.

To accommodate larger medications 52 that are not suitable for a turntable 40, a large drawer (not shown) may be included near the bottom of the refrigerated compartment 22. The drawer would include a suitable lock that would allow the drawer to be unlocked separately from the access doors 26. More than one drawer may be included in the refrigerated compartment 22 if needed.

Referring to FIG. 3, each divided section 43 is identified by a marking or label 56 secured on the exterior of the lip 54. The label 56 includes a numeric indicator or other identifying mark to direct users to the correct turntable location when loading and unloading the medications 52 into the refrigerated compartment. The label 56 may additionally include a bar code containing the location information, and the bar code may be scanned into a database stored on the computer system 34. For example, the labels may be scanned with any suitable scanner that is electrically or wirelessly connected to the computer system 34. The medications 52 are also preferably labeled with an identifying mark before being loaded into the refrigerated compartment 22. The medication label may include a bar code containing the National Drug Code (NDC) or any other suitable identifying reference number that can be scanned into the database. In this manner, both the medication content and the location of the medication 52 within the refrigerated compartment 22 may be tracked.

Referring to FIG. 1, at least some of the information tracked within the database may be displayed on a numeric indicator 41 positioned adjacent each access door 26. For instance, the numeric indicator 41 may display the correct pick location, quantity, etc., when a user is picking medications from the dispenser 20.

Referring to FIG. 1, the computer system 34 is used to control the function of the dispenser 20 and communicate with a system server (not shown). Any suitable software program may be installed on the computer system 34 and the system server for controlling the operation of the dispenser 20. Preferably, a software package similar to AutoPharm® software, available from Talyst, Inc., located in Bellevue, Wash., is used. The software package allows for inventory tracking and dispensing control. For example, a medication loaded into the refrigerated compartment 22 that is barcode labeled with a medication identifier could be scanned and assigned a location by the software package. Moreover, the system server may be part of a larger network that includes a plurality of remotely located dispensers 20, where the system server tracks inventory levels and dispensed medications of each dispenser 20 connected to the network, similar to the system disclosed in U.S. Provisional Patent Application No. 60/913,250, entitled "Remote Automated Dispensing System," filed Apr. 20, 2007, the disclosure of which is hereby expressly incorporated by reference. Any suitable interface between the system server and the dispenser 20 may be used, such as TCP/IP.

A user may interface with the software package on the computer system 34 to select a medication to be dispensed. To prevent unauthorized users from accessing the medications, the user must input a password before accessing the software package. The software package could also be used to optimize the picking order so as to minimize picking time when the user desires to dispense a large number of medications from the dispenser 20.

In a particular embodiment, the dispenser 20 includes a suitable programmable logic controller (PLC) for controlling the components of the dispenser 20. The PLC may be integrated within the computer system 34, or may instead be replaced by a PC 104 type computer (not shown). The PLC receives input from the computer system 34, from a plurality of sensors mounted within the refrigerated compartment 22, from the security panel 30, and from a control pad 32 installed on the main door 24 that allows authorized users to manually operate the carousel assembly 36. The plurality of sensors disposed within the refrigerated compartment 22 may include, for example, sensors for detecting events, errors, failures, security breaches, etc. For instance, a flag sensor 72 may be positioned on a bracket assembly 66 for sensing a home flag (not shown) secured to the underside of the turntable 40. Other sensors may also be secured to the turntables 40, such as sensors for detecting medications 52 that are incorrectly stowed within the compartment 22 or to detect if the medications 52 are not properly sealed. Sensors may also be positioned adjacent to the main door 24, the secondary door 27, and the access doors 26 for detecting whether the doors are open or closed or to automatically identify medications 52 that have been removed.

The sensor data and the signals from the computer system 34 are processed by the PLC, which outputs appropriate control signals to control the dispenser components. For instance, when the user interfaces with the software package to select a medication to dispense, the computer system 34 signals the PLC to rotate the turntable 40 until the appropriate medication faces the access door 26. The computer system 34 further signals the PLC to unlock the appropriate access door 26 and keep all other doors locked. The computer system 34 may also signal the PLC to display the medication information on the numeric indicator 41 and any other required information on the display panel 45.

The PLC also outputs the appropriate signals to maintain the security of the dispenser 20. For instance, signals are sent to the appropriate puck drive mechanism 62 to prevent movement of a turntable 40 if an adjacent access door 26 is opened. In this manner, the turntables 40 cannot be rotated to allow the user to access unauthorized medications 52 on the turntable 40 that are otherwise inaccessibly located behind the dividers 42. Output signals may also cause an alarm to sound if a door is left opened a predetermined amount of time, or to send error signals to the computer system 34 for displaying error messages or providing data for diagnosing failure.

In operation, the refrigerated dispenser 20 is used to dispense medications in an automated, secure fashion. After the refrigerated compartment 22 has been stocked with medications 52 and the medications 52 have been assigned a location by the software package, a user interfaces with the computer system 34 to select a medication 52 to be dispensed. The software package signals the PLC to initiate the appropriate puck drive assembly 62 to rotate the corresponding turntable 40. The turntable 40 is rotated until the desired medication 52 is positioned adjacent to an access door 26. The PLC then receives a signal to unlock the appropriate access door 26 such that the user may access the medication 52. With the turntable 40 rotated to position the desired medication adjacent to the unlocked access door 26, the dividers 42 prevent the user from accessing other medications on the turntable 40.

After the medications have been removed by the user, the user may scan the bar code on the medication 52 to both verify that the correct medication has been picked and to upload data to the computer system 34 indicating that the medication has been removed from the dispenser 20. In this manner, the inventory of the dispenser 20 may be tracked. The inventory levels of the medications can be automatically uploaded to the server such that if the inventory of any medication drops below a specified level, a new order request may be automatically sent to the appropriate pharmacy.

In the event of a software failure, the control panel 32 may be used to control the operation of the carousel assembly 36 and the access doors 26 of the refrigerated compartment 22. The control panel 32 may also be used to manually override any movements of the turntables 40 or the unlocking or locking of the access doors 26 by the software. Moreover, the release levers 76 may be used to unlock the turntables 40 and allow manual rotation of the turntables 40.

Figure 5:
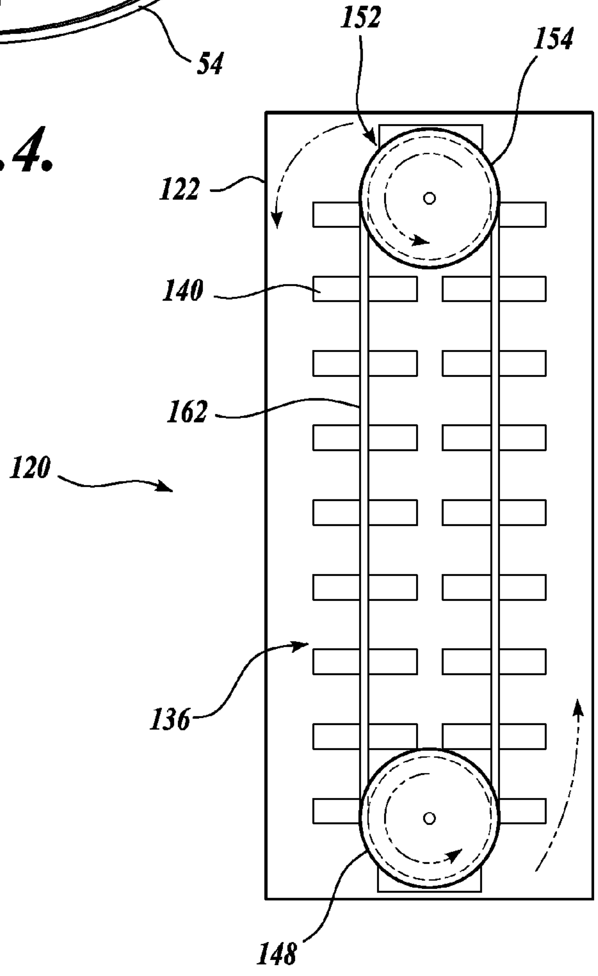
FIG. 5 is a schematic view of a first alternate embodiment of a refrigerated dispenser, showing an interior revolving container assembly.

Now referring to FIG. 5, a first alternate embodiment of a refrigerated dispenser 120 is substantially identical to the preferred embodiment described above except that the dispenser 120 includes a revolving container assembly 136 rather than a carousel assembly 36. The revolving container assembly 136 is defined by a first roller chain assembly 152 having first and second drive sprockets 148 and 154 rotatably disposed within the refrigerated compartment 122 and a roller chain 162 drivably connecting the first and second drive sprockets 148 and 154. The first roller chain assembly 152 is positioned near one side of the refrigerated compartment 122. A second roller chain assembly (not shown) substantially identical to the first roller chain assembly 152 is disposed on the opposite side of the refrigerated compartment 122 and substantially mirrors the first roller chain assembly in its position. As such, a second roller chain (not shown) of the second roller chain assembly follows substantially the same path as the first roller chain.

A series of containers 140 adapted to hold medications are suspended between and pivotally connected to the first and second roller chains. The containers 140 pivot as the roller chains move such that the top opening of the containers 140 (not shown) continuously face in an upward direction regardless of the movement of the first and second roller chains.

The revolving container assembly 136 is adapted to move the containers 140 about the path defined by the first and second roller chains. The sprockets are driven by a suitable motor (not shown) to move the roller chains, and the containers 140 move with the roller chains until the desired container aligns with an access door. The appropriate access door is then unlocked, as described above, such that a user may access the desired medication.

It should be appreciated that other suitable assemblies may instead be used to move the containers 140 in a generally elliptical or circular path, such as a belt drive assembly or a pulley system. Moreover, the revolving container assembly 136 may instead include a central horizontal bar or axis having arms extending radially outwardly therefrom, wherein the containers 140 are coupled to the end of the arms, similar to a ferris wheel design (not shown).

While the preferred embodiment of the present disclosure has been illustrated and described, it will be appreciated that various changes can be made therein without departing from the spirit and scope of the present disclosure.

The invention claimed is:

1. A medication dispenser, comprising:

(a) a refrigerated compartment having an interior and an exterior;

(b) a plurality of access doors formed in the refrigerated compartment and adapted to provide access to a limited portion of the interior of the refrigerated compartment;

(c) a lock configured to lock and unlock each access door separately from the other access doors;

(d) a carousel assembly disposed within the interior of the refrigerated compartment, the carousel assembly including a plurality of turntables each having a base that defines an unobstructed central opening, each turntable mounted within the refrigerated compartment such that it is independently rotatable with respect to the other turntables, wherein each of the turntables are adapted to receive a plurality of medications of a pre-selected type in a predetermined location, and wherein one of each of the plurality of turntables is aligned with one of each of the plurality of access doors;

(e) a drive assembly capable of independently rotating the turntables without the use of a drive shaft extending through the unobstructed central openings of the turntables;

(f) a computer system adapted to receive a first input selecting a quantity of medications of a pre-selected type out of the plurality of medications of the pre-selected type for dispensing, the computer system adapted to output a first signal in response to the first input;

(g) a controller operably coupled to the refrigerated compartment and adapted to receive the first signal from the computer system, wherein the controller is adapted to output a second signal to rotate a first turntable such that the selected medications are positioned adjacent one of the plurality of access doors, and wherein the controller is adapted to output a third signal to unlock the adjacent access door such that the selected quantity of medications of the pre-selected type may be dispensed.

2. The medication dispenser of claim 1, wherein only the selected medications are accessible on the turntable when the adjacent access door is unlocked.

3. The medication dispenser of claim 1, wherein the plurality of turntables further comprise a plurality of upright dividers that separate the turntable into a plurality of sections.

4. The medication dispenser of claim 3, wherein only one of the plurality of sections on the turntable is accessible when the adjacent access door is unlocked.

5. The medication dispenser of claim 3, wherein each medication includes a medication identifier and each turntable section includes a location identifier.

6. The medication dispenser of claim 5, further comprising a scanner, wherein the scanner is in communication with the computer system.

7. The medication dispenser of claim 6, wherein the medication identifier comprises a bar code that is scannable by the scanner.

8. The medication dispenser of claim 6, wherein the location identifier comprises a bar code that is scannable by the scanner.

9. The medication dispenser of claim 7, wherein the scanner selectively sends medication identifier data and location identifier data to the computer system, and wherein the computer system includes a software program for processing the data to verify that the correct type of medication has been dispensed and to track the location and inventory of each type of medication.

10. The medication dispenser of claim 1, wherein each turntable is defined by a plurality of containers joined together.

11. The medication dispenser of claim 1, further comprising a plurality of indicators, wherein one of each of the plurality of indicators is placed adjacent one of each of the plurality of access doors, and wherein the indicators display the quantity of the medication selected for dispensing.

12. The medication dispenser of claim 1, wherein the computer system is secured within the refrigerated compartment.

13. The medication dispenser of claim 1, wherein the computer system receives input selecting a quantity of a medication of a pre-selected type to be dispensed through a software program installed on the computer system.

14. The medication dispenser of claim 1, wherein the computer system receives input selecting a quantity of a medication of a pre-selected type to be dispensed through a software program installed on a remote system.

15. The medication dispenser of claim 1, wherein the drive assembly comprises a plurality of drive mechanisms separately engageable with each of the plurality of turntables.

16. The medication dispenser of claim 15, wherein each of the drive mechanisms comprises a puck drive roller driven by a motor/encoder assembly.

17. The medication dispenser of claim 15, wherein the drive mechanisms are configured to rotate the turntables in first and second directions.

18. The medication dispenser of claim 1, wherein the access doors are opaque such that the plurality of medications received on the turntables are not viewable through the access doors.

* * * * *